US005620728A

United States Patent [19]
Langley et al.

[11] Patent Number: 5,620,728
[45] Date of Patent: *Apr. 15, 1997

[54] METHOD AND APPARATUS FOR THE EXTRACTION OF OILS FROM GRAIN MATERIALS AND GRAIN-BASED FOOD PRODUCTS

[75] Inventors: Charles E. Langley, Jennings, La.; Stanley Finelt, The Woodlands, Tex.

[73] Assignee: Food Sciences, Inc., Jennings, La.

[*] Notice: The term of this patent shall not extend beyond the expiration date of Pat. No. 5,445,841.

[21] Appl. No.: 341,519

[22] Filed: Nov. 17, 1994

Related U.S. Application Data

[63] Continuation-in-part of Ser. No. 12,118, Feb. 1, 1993, Pat. No. 5,445,841, and Ser. No. 19,978, Feb. 19, 1993, Pat. No. 5,408,924.

[51] Int. Cl.⁶ .............................. A23L 1/015; C11B 1/08
[52] U.S. Cl. ................... 426/312; 426/430; 426/442; 426/489; 426/492; 426/425; 426/618; 426/621; 554/8; 554/9; 554/17; 554/16; 554/20; 554/22
[58] Field of Search .................... 426/495, 917, 426/442, 312, 621, 618, 626, 425, 430, 492, 489, 507, 447, 449, 450; 554/8, 9, 13, 17; 99/80, 153; 55/50, 17

[56] References Cited

U.S. PATENT DOCUMENTS

| 2,448,729 | 9/1948 | Ozai-Durrani | 99/80 |
| 2,538,007 | 1/1951 | Kester | 99/153 |
| 2,727,914 | 12/1955 | Gastrock et al. | 260/412.4 |

(List continued on next page.)

FOREIGN PATENT DOCUMENTS

| 0326622 | 1/1988 | European Pat. Off. . |
| 0290156 | 11/1988 | European Pat. Off. . |
| 2022725 | 8/1970 | France . |
| 2278397 | 2/1976 | France . |
| 1466479 | 3/1977 | United Kingdom . |
| 2052551 | 1/1981 | United Kingdom . |
| WO9117985 | 11/1911 | WIPO . |

OTHER PUBLICATIONS

Abstract of Japanese Publication No. JP62186757, Published Aug. 15, 1987.
Abstract of Soviet Union Publication No. 302359, Published week 10, 1972.
Abstract of Soviet Union Publication No. 988,860, dated Jan. 15, 1983.
Abstract of Soviet Union Publication No. 973,602, dated Nov. 15, 1982.
Bulley, N.R., et al, *Supercritical Fluid Extraction of Vegetable Oil Seeds*, J. Am. Oil Chem. Soc., vol. 61, No. 8, pp. 1362–1365 (Aug. 1984).

(List continued on next page.)

*Primary Examiner*—Anthony J. Weier
*Attorney, Agent, or Firm*—Conley, Rose & Tayon, P.C.

[57] ABSTRACT

The present invention pertains to a method of obtaining oil from grain materials such as rice bran, wheat mill feed, rapeseed, amaranth, and similar grains. The method includes an apparatus for use in extracting oil from vegetable matter, comprising: a horizontally extending pressure-tight container having an inlet end and an outlet end, a horizontally extending porous endless belt in said container having upper and lower runs, a belt driver for continuously moving the upper run of said belt from near the inlet end of the container to near said outlet end, a feed inlet near the inlet end of the container, positioned to deposit the vegetable matter feed on the belt near said inlet end, to create a continuously moving bed of vegetable material on the belt, a solvent vapor inlet positioned to allow solvent vapor to flow through said bed to extract oil from said vegetable matter, a condenser positioned to condense solvent vapor that passes through said bed and to allow said condensate to fall back onto said bed, a liquid applicator positioned to apply liquid solvent to said bed downstream of said solvent inlet, an outlet from said container for the vegetable matter from which the oil has been extracted, and an outlet from said container for extracted oil and solvent.

10 Claims, 4 Drawing Sheets

U.S. PATENT DOCUMENTS

| | | | |
|---|---|---|---|
| 2,733,136 | 1/1956 | Andrews | 23/270 |
| 2,829,055 | 4/1958 | Ozai-Durrani | 99/80 |
| 3,261,690 | 7/1966 | Wayne | 99/80 |
| 3,271,160 | 9/1966 | Kopas et al. | 99/2 |
| 3,649,294 | 3/1972 | Thijssen | 99/18 |
| 3,650,763 | 3/1972 | Touba | 99/82 |
| 3,852,504 | 12/1974 | Mihara et al. | 426/373 |
| 3,867,416 | 2/1975 | Barns | 260/412.8 |
| 3,966,982 | 6/1976 | Becker et al. | 426/430 |
| 4,008,210 | 2/1977 | Steele et al. | 260/123.5 |
| 4,083,836 | 4/1978 | Anjou et al. | 260/123.5 |
| 4,104,290 | 8/1978 | Koslowsky | 260/428.5 |
| 4,154,728 | 5/1979 | Oughton | 260/123.5 |
| 4,158,656 | 6/1979 | Jones et al. | 260/123.5 |
| 4,183,292 | 1/1980 | Banks | 99/468 |
| 4,190,577 | 2/1980 | Steele et al. | 260/123.5 |
| 4,213,941 | 7/1980 | Boomer | 422/267 |
| 4,221,764 | 9/1980 | Saxon | 422/268 |
| 4,246,184 | 1/1981 | Pressick et al. | 260/412.4 |
| 4,325,882 | 4/1982 | Reiners | 260/412.4 |
| 4,353,837 | 10/1982 | Barns | 260/412.4 |
| 4,359,417 | 11/1982 | Karnofsky et al. | 260/123.5 |
| 4,376,073 | 3/1983 | Farmer | 260/123.5 |
| 4,486,353 | 12/1984 | Matsuzaki et al. | 260/412.4 |
| 4,493,854 | 1/1985 | Friedrich et al. | 426/629 |
| 4,495,207 | 1/1985 | Christianson et al. | 426/312 |
| 4,808,426 | 2/1989 | Strop et al. | 426/417 |
| 4,857,279 | 8/1989 | Kawamata et al. | 422/268 |
| 4,888,180 | 12/1989 | Wu | 426/618 |
| 5,035,910 | 7/1991 | Jones et al. | 426/478 |
| 5,041,245 | 8/1991 | Benado | 260/412.1 |
| 5,047,254 | 9/1991 | Lee | 426/417 |
| 5,069,923 | 12/1991 | Hubbard et al. | 426/445 |
| 5,077,071 | 12/1991 | Strop | 426/417 |
| 5,085,884 | 2/1992 | Young et al. | 426/611 |
| 5,086,166 | 2/1992 | Lawhon et al. | 530/378 |
| 5,091,116 | 2/1992 | Krishnamurthy et al. | 260/409 |
| 5,093,146 | 3/1992 | Calandro et al. | 426/619 |
| 5,094,764 | 3/1992 | Kuwamoto et al. | 252/49.3 |
| 5,104,587 | 4/1992 | Besserman et al. | 554/175 |
| 5,104,678 | 4/1992 | Yang | 426/601 |
| 5,112,637 | 5/1992 | Hron, Sr. et al. | 426/629 |
| 5,135,765 | 8/1992 | Kishi et al. | 426/417 |
| 5,138,075 | 8/1992 | Ohgaki et al. | 549/413 |
| 5,209,940 | 5/1993 | Champagne et al. | 426/320 |

OTHER PUBLICATIONS

Gulbaran Tulbentci, H.S., *Extraction of Rapeseed, Linseed, Safflowerseed and Tobaccoseed with a New Laboratory Extractor*, J. Am. Oil Chem. Soc., vol. 63, No. 11, pp. 1465–1469 (Nov. 1986).

Canessa, C.E., et al *Total Oil Analysis of Soybeans by Simultaneous Grinding and Solvent Extraction*, J. Am. Oil Chem. Soc., vol. 68, No. 9, pp. 675–677 (Sep. 1991).

Sayre, R.N., et al, *Extraction and Refining of Edible Oil from Extrusion–Stabilized Rice Bran*, J. Am. Oil Chem. Soc., vol. 62, No. 6, pp. 1040–1043 (Jun. 1985).

Kim, C. J., et al, *Comparison of Solvent Extraction Characteristic of Rice Bran Pretreated by Hot Air Drying, Steam Cooking and Extrusion*, J. Am. Oil Chem. Soc., vol. 64, No. 4, pp. 514–516 (Apr. 1987).

Yoon, S. H., et al, *Composition of Waxes from Crude Rice Bran Oil*, J. Am. Oil Chem. Soc., vol. 59, No. 12, pp. 561–563 (Dec. 1982).

METHOD AND APPARATUS FOR THE EXTRACTION OF OILS FROM GRAIN MATERIALS AND GRAIN-BASED FOOD PRODUCTS

This is a continuation-in-part of U.S. patent applications Ser. No. 08/012,118, filed Feb. 1, 1993, now U.S. Pat. No. 5,445,841, and Ser. No. 08/019,978, filed Feb. 19, 1993, now U.S. Pat. No. 5,408,924.

FIELD OF THE INVENTION

This invention pertains to a process and apparatus for the extraction of oils from grain materials such as rice bran, wheat mill feed, rapeseed, amaranth and similar grain. A specially designed apparatus and process is used to achieve this separation. Use of the apparatus and process not only provides the extracted oil, but also enables production of a number of grain products having low residual oil content, which products have particularly desirable food and feed characteristics.

The process for oil extraction from grain materials can also be applied to crushed or flaked vegetable matter and to grain-based food products that are somewhat porous, such as chips, noodles and crackers.

BACKGROUND OF THE INVENTION

It is known that the best and easiest oilseed to process is soy bean. Rapeseed has also been processed on the kind of equipment used to process soy bean; however, it must be ground, cooked, and rolled into flakes to provide an extractable bed. Generally flakes can be run only at a much slower rate than soy beans. The resultant rapeseed residual material after oil removal, called "marc", cannot readily be used as meal for animal feeding due to the presence of trypsin inhibitors, high euric acid and high glucosinolates.

The process and apparatus of the present invention can be used to process oil seeds such as soy bean and safflower; however, the apparatus is particularly beneficial in obtaining oil from granular sources such as rice bran, wheat mill feed, rapeseed in general, and amaranth (as well as similar grains), which have lower oil content than soy bean and safflower and, except for rapeseed, have not been economically competitive as an oil source prior to the present process. Typically, oil seeds contain from about 15 percent to about 40 percent by weight oil. Most of the grains of the kind described above contain only from about 4 percent to about 40 percent by weight oil. Prior to the method of the present invention, processing of grain materials having this low oil content was not competitive with processing of oil seeds. The present oil extraction method makes possible not only the extraction of oil from grain materials, but further extraction of additional oils from crushed or flaked vegetable materials previously oil extracted using a less efficient method of extraction, such as crushed peanuts, cacao beans or olives. The present oil extraction method also enables additional oil extraction from grain-based products such as chips, noodles and crackers, by way of example and not limitation.

Edible oils are usually extracted from most oil seeds by soaking crushed or pulverized seeds in liquid hexane. Usually, the seeds are washed with hexane five to seven times to ensure the maximum recovery of oil. The amount of hexane required for such washing is quite high, up to 40 times the weight of oil recovered. The oil is then separated from the oil-hexane solution, or "miscella" by distillation or evaporation, and the hexane solvent is recovered for recycle use in the separation process. The marc that remains after removal of the oil from the seeds is generally a powder and contains substantial amounts, up to about 40 percent, of hexane. The marc is then dried to recover the residual hexane. Recovery of the hexane from the miscella and from the marc are both energy intensive processes and require extensive capital equipment.

As previously discussed, rapeseed has been processed on soy bean equipment; it must be ground, cooked and rolled into flakes prior to oil extraction. Even then, the process rate in oil seed processing equipment is only marginally cost effective compared with soy bean. Other potential vegetable matter sources of oil include wheat mill feed, amaranth, and rice bran, for example. Wheat mill feed is the material removed from wheat during milling. Twenty percent or more of all the world's wheat ends up as mill feed. Most of this goes into pet food and animal feed. Amaranth, another potential source of oil, known in the midwest as "pig weed", grows wild. The amaranth cultivars are available to anyone through the U.S.D.A. Wheat mill feed and amaranth can both be extruded into a pellet because they contain sufficient amounts of starch and sugars. The pellets can be processed on standard soy bean equipment, but the hexane solvent typically used for extraction also extracts large quantities of green chlorophyll so that the oil is difficult to refine as well as being dark green, almost black in color.

Rice bran requires a particularly specialized process. The rice bran cannot easily be flaked or made into an extrudable pellet because of lack of starch and the presence of sucrose. Rice bran can be extruded if corn starch is added, but the sucrose can caramelize if heated in the presence of air, giving a dark hue to the oil product. Rice oil can be extracted with hexane using an extractor of the type used to process soy beans, but this process is comparatively slow, energy intensive and expensive when compared to soy beans. Moreover, the remaining rice bran flour still has substantial oil in it.

The present invention provides a very economical method and apparatus for extracting oil from vegetable matter, providing cost advantages over currently utilized techniques. Oil is extracted in a fraction of the time required for previously used commercial methods, and to a substantially greater degree. By use of the process of the present invention, rice bran can be produced which has an oil content of less than five percent, and has no objectionable odor or taste, so that it is suitable for use in human food products. Further, the present invention results in the production of high quality oils at a cost substantially less than is possible with present commercial processes.

SUMMARY OF THE INVENTION

In accordance with the present invention, edible oils can be extracted from vegetable matter such as, for example, rice bran, wheat mill feed, rapeseed, and amaranth in a manner which provides low temperature, low-energy-consumption processing conditions. Other oil producing vegetables, such as corn, olives, cacao beans and peanuts, are also advantageously processed to extract oil by use of the apparatus and method of this invention. The apparatus and method of the present invention can also be applied to vegetable-based products wherein the product is in a flaked or thin strip form, such as chips, noodles, crackers and the like. All of such materials are intended to be included in the term "vegetable matter" in this description and the appended claims.

The extracted grain product is stabilized against degradation while offering valuable food and feed potential.

If necessary, granular and seed materials from which oil is to be extracted can be prepared for oil extraction by mechanical size reduction using methods known in the art. Grain materials having a relatively high porosity (in the range of 50% or more internal porosity) typically will not have to be reduced in size prior to oil extraction.

According to this invention oil is extracted from vegetable matter by contacting the vegetable matter with both vapor and liquid phases of a solvent for the oil, which solvent is not a solvent for the protein in the vegetable matter. Preferably, the solvent is vaporized by heating vacuum. Contact of the solvent vapor with the vegetable matter is provided by a differential at or near atmospheric pressure, although it may also be vaporized under pressure or under a pressure across a moving bed of the vegetable matter, and at a temperature that is not so high as to cause degradation of either the oil or the oil-depleted vegetable matter. Applicants have discovered that there is an advantage in using particular vaporized solvents which are capable of forming a weak chemical bond or association with the oil to be extracted. Such solvents permit more rapid oil extraction under milder extraction conditions. This weak bonding or association permits the solvent molecule and the oil molecule to act as one unit for purposes of removing the oil from the grain material, vegetable matter or grain-based flood product; however, since the bond or association is weak, the solvent can be subsequently separated from the oil using distillation techniques which make sufficient energy available for breaking the weak bond or association.

The vegetable matter from which oil is to be extracted is fed to an extractor where it is moved along a perforated conveyor belt while the vaporized extraction solvent is passed upwardly through the vegetable matter in the first stage. Preferably, the vaporized solvent is carried upwardly by a pressure drop across the bed of vegetable matter on the belt. For example, the vaporized solvent can be passed from a source beneath the perforated conveyor belt, up through the grain material or grain-based food product and toward a condenser located above the grain material. At least a portion of the vaporized solvent condenses upon contact with the grain material, thereby wetting the grain material and initiating oil extraction without channeling through the bed of solvent. A portion of the solvent vapor that does not condense upon contact with the grain material condenses on the condenser and drops back onto and through the grain material. In addition to the condensed solvent, additional liquid solvent is subsequently sprayed onto the vegetable matter in the second stage of the extractor. A substantial portion of the liquid miscella formed by extracted oil and solvent drains downward by gravity or differential pressure through the perforated belt and is collected below the conveyor belt for further treatment.

A small proportion of the miscella typically remains in the bed of vegetable matter due to surface tension. In a preferred embodiment of this invention, this miscella is separated from the remaining solid material, or marc, in the third stage of the extractor, by causing a dry inert gas, such as nitrogen, to flow downward through the horizontally moving bed of the marcmiscella mixture carded on the belt. The gas flow is produced by a pressure differential across the bed, provided by pressure above the bed, vacuum below it, or a combination of pressure and vacuum. The temperature and pressure differential are controlled so as to blow substantially all of the remaining miscella through the perforated belt. It should be noted that while this description is based on a single extractor, two extractors in series can be used to separate the three stages of the extractor, i.e., extraction in the first extractor and gas displacement in the second.

The extracted vegetable matter may be processed to remove residual solvent using techniques known in the art such as steam heated rotary drum drying and/or vacuum assisted solvent removal techniques. The extracted vegetable matter typically is processed by exposure to heat and/or vacuum, depending on the fragility of the product. The oil/solvent miscella collected may be stored prior to further processing.

The miscella is separated by processing in a specially developed separation process. Typically its oil/solvent composition ranges from about 10 percent oil with 90 percent solvent to about 70 percent oil with 30 percent solvent, on a weight to weight basis, and the preferred apparatus for separation comprises two flash towers, a stripper and a dehydrator.

Extraction of oil according to this invention is much faster than conventional liquid hexane extraction, and requires only a fraction of the amount of solvent. The process operates at much lower temperatures than are common in hexane extraction, so that proteins are not denatured, and so that most of the water is not removed from the marc. Azeotropes are not formed with the solvent except when extreme conditions are used. The vegetable matter does not have to be cooked or mechanically prepared before processing. The energy requirements for the method are much less than for conventional extraction methods. Not only are edible oils produced from the process of the present invention, but numerous products comprising the marc are of special interest as valuable food and feed products.

A blend of extracted amaranth marc with extracted, stabilized rice bran marc provides a specific outstanding feed product which has the amino acid equivalent of soy bean meal. The preferred blend typically ranges from about 80:20 to about 60:40, rice bran marc: amaranth marc, on a weight to weight basis. The blend of rice bran marc with amaranth marc typically has a total oil content ranging from about 0.5 percent to about 10 percent by weight oil. Additives can be combined with the marc blend if desired for a particular application. A particularly preferred animal and poultry feed product obtainable using the extraction process of the present invention is a blend of the stabilized rice bran marc with whole amaranth. The preferred blend comprises a ratio of rice bran marc to whole amaranth ranging from about 75:25 to about 60:40, on a weight to weight basis. The blend of rice bran marc with whole amaranth typically has a total oil content ranging from about 2 percent to about 14 percent by weight oil. As previously described, other additives can be combined with the blend if desired.

Another outstanding feed product which can be generated from marc obtained using the process of the present invention comprises rapeseed marc and another component selected from the group consisting of rice bran marc, amaranth marc, whole amaranth, or mixtures thereof, wherein the weight to weight ratio of rapeseed marc to the component selected ranges from about 30:70 to about 50:50. This feed product typically has a total oil content ranging from about 0.05 percent by weight to about 14 percent by weight oil.

The grain-based food products such as crackers, noodles and chips which are processed using the oil extraction process of the present invention contain significantly less oil (typically 2–10% by weight) than similar grain-based food products currently marketed.

BRIEF DESCRIPTION OF THE DRAWINGS

For a detailed description of a preferred embodiment of the invention reference will now be made to the accompanying drawings wherein.

DETAILED DESCRIPTION OF THE PREFERRED EMBODIMENTS

The following description is in terms of using the invention for the extraction of rice oil from rice bran, although the apparatus and method, with minor modifications dictated by characteristics of the particular material, have application to a wide range of oleaginous vegetable materials, including brans from other cereal grains, seed grains such as amaranth, rapeseed and soy beans, other oleaginous vegetables such as corn, cacao beans and peanuts, and vegetable products such as chips, noodles, crackers and the like. All such materials are included herein within the term "vegetable matter".

Rice bran and wheat mill feed can be extracted without previous treatment. Rice bran results from milling dehulled brown rice grains to abrade away the brown covering, producing polished white rice grains with the bran as a by-product consisting of small flaky particles. The rice bran, due to enzymatic action and its oil content, is highly susceptible to lipolytic rancidity within a few hours if it is not stabilized shortly after milling. To obtain oil which is low in off-flavors, it is therefore desirable to process the bran shortly after milling. When desirable, the rice bran can be stabilized from degradation and prepared for oil extraction by, for example, the method described in our copending U.S. patent applications Ser. No. 07/901,350, filed Jun. 19, 1992, and Ser. No. 08/012,118, filed Feb. 1, 1993, the disclosures of which are incorporated herein by reference. However, it is sometimes desirable to allow the enzymatic action to continue for a few days, if the products resulting from such action are desired.

Although oil can be extracted in accordance with this invention from rice bran and some other brans and chips without any preparatory processing, it will be necessary to prepare some of the vegetable materials, depending upon their oil content and particle size. Vegetable sources which contain a significant amount of oil, such as corn, rapeseed, flaxseed, soybeans, cottonseed, olives, cacao and amaranth may be extracted after grinding or other pulverization which renders the oil content more accessible. Such vegetable sources which have been processed by mechanical pressing techniques, as is the long-standing practice, still contain a significant amount of oil, and more oil may be extracted from the remaining pulp by the present invention.

Figure 1:
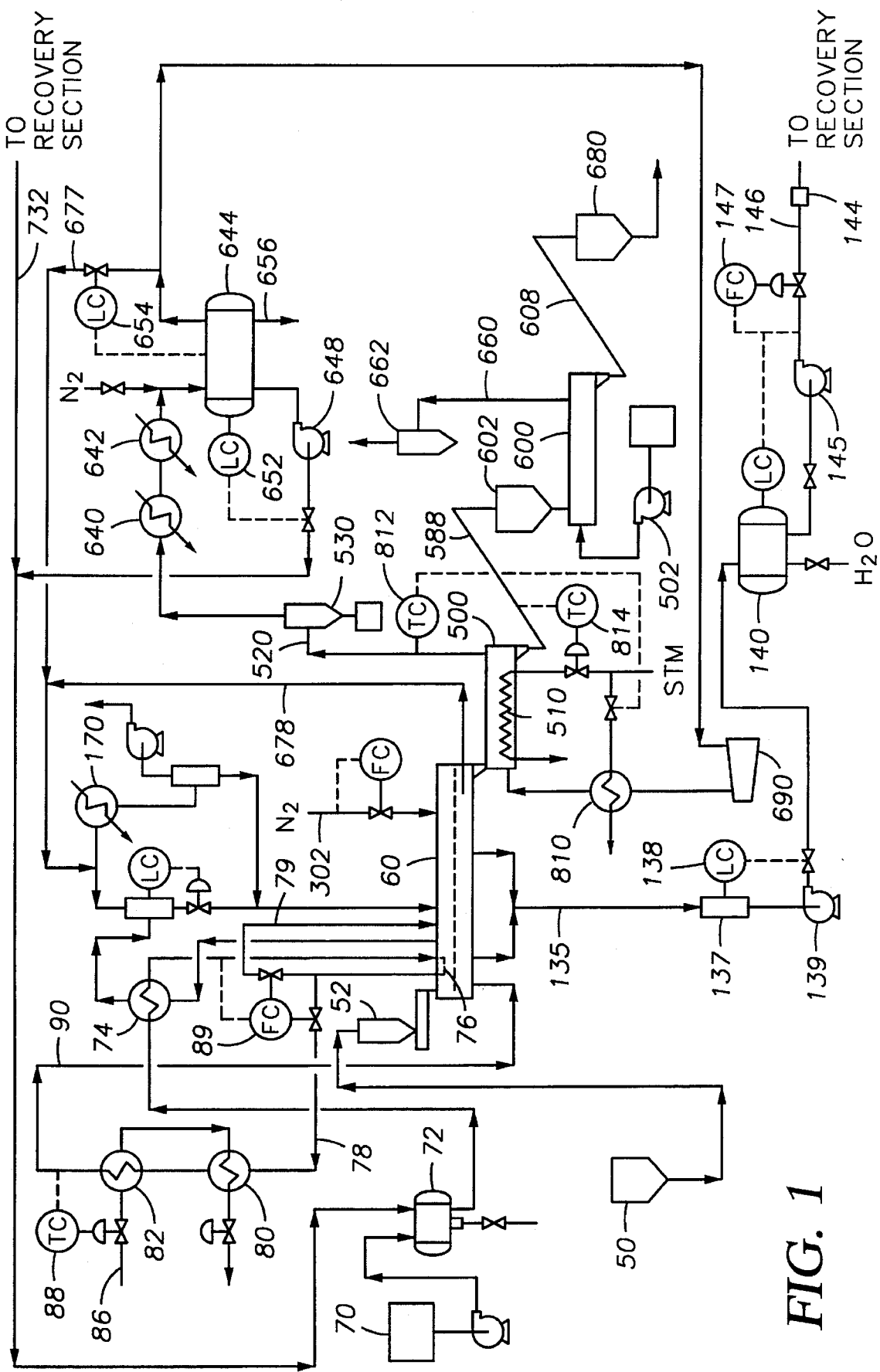
FIG. 1 is a flow diagram of a preferred embodiment of the extraction system and apparatus of the present invention.

Referring initially to FIG. 1, the grain to be extracted is initially stored in silo 50. From storage silo 50, grain is fed to a surge bin 52 and from surge bin 52 into extractor 60. Extractor 60, as described in greater detail below, comprises an apparatus for moving the grain horizontally through a series of solvent extracting treatments.

Similarly, solvent entering the system of the present invention is stored initially in tank 70, from which it is passed into surge drum 72. From surge drum 72, solvent flows through a heat exchanger 74, in which it is preheated, and then into extractor 60, where it is passed through extractor coils 76 to gain additional preheat. From extractor coils 76, the solvent stream leaves extractor 60 and is divided into two streams 78, 79. Stream 79, comprising preheated liquid solvent, reenters the second stage of extractor 60 and is sprayed onto the grain as described in detail below. Stream 78 is passed through a pair of additional heat exchangers 80, 82 wherein it is vaporized and superheated by thermal contact with steam in stream 86. The superheated vapor stream 78 is fed directly into the bottom of the first stage of extractor 60, as described below. It will be understood that the ratio of the volume of stream 78 to 79 can be varied as desired by use of flow ratio controller 89. Likewise, the vapor superheat temperature is controlled at heat exchanger 82 by a temperature controller 88, and can be varied as required. According to a preferred embodiment, the solvent, which is preferably ethyl acetate, is superheated to about 175° F. to 180° F. The boiling point of ethyl acetate, at one atmosphere pressure is 171° F. Higher superheat temperatures can be used, but are limited at the upper end by the temperature at which the vegetable and/or the oil therein begins to degrade. Depending upon the solvent used and the vegetable matter processed, an optimum superheat temperature can be easily established for a given vacuum applied.

A simplified view of the extractor 60 of the present invention is shown in FIGS. 2 and 3A–C. According to the preferred embodiment of this invention, oil is separated from the vegetable matter in three stages. Apparatus 60 comprises a vapor contact section 100, a liquid contact section 200, and a liquid removal and recovery section 300. In extractor 60, vegetable matter is substantially continuously deposited from an inlet 62 onto a moving, porous conveyor belt 112, and is spread to a substantially uniform depth by a plow 111. Conveyor belt 112 preferably moves horizontally at a pre-selected constant speed, being driven by a drive pulley 113, which in turn is driven by a motor 115. Belt 112 is carried over an idler pulley 117 at the opposite end of the apparatus.

The depth of the grain bed on the conveyor belt 112 in the extractor may be from 3 to 10 inches, but is preferably 4 to 8 inches for rice bran. A depth of 4 to 5 inches has been found to work best for rice bran. Different vegetable matter will require different depths for maximum efficiency, depending on the porosity of the bed and the rate of extraction of the oil from the vegetable matter. The most desirable depth of vegetable matter can be determined by trial and error with minimal experimentation. The porosity of the belt must be such as to allow flow of vapor through it, preferably without significantly restricting the flow of the solvent, while allowing no more than a minor amount of the vegetable matter to fall through. For rice bran, a 60 to 120 mesh, preferably about 80 mesh, polyethylene belt has been found to give good results. In some applications, a porous membrane, rather than a perforated be it, may allow sufficient flow of the solvent.

The depth of the bed is preferably maintained by the rate of flow of the vegetable matter onto the belt, by the plow 111, by a plurality of upstanding transverse ribs 134 spaced along the length of the belt 112, and by side walls 136 engaging each longitudinal side of the belt.

According to a preferred embodiment, vaporized solvent enters the first stage vapor chamber 114 below porous belt 112, from vapor inlet conduits 115, and flows upwardly through the belt 112 and through the bed of vegetable matter conveyed on the surface of the belt, while the belt carries the bed of vegetable matter substantially horizontally to the left, as shown in the drawing. The flow of solvent vapor is assisted by a pressure differential across the bed, which is produced by the combination of positive pressure at which the solvent vapor is generated, and by a vacuum above the bed created by vacuum pump (555 of FIG. 1), which reduces the pressure in flues 119, and by coil 76, and exchanger 74, on which solvent vapor that passes through the vegetable bed condenses. Other means for creating a suitable pressure differential, such as a fan, steam jets, aspirators, etc. may also be used. The greater the pressure differential across belt 112, the greater will be the rate of movement of the vapor through the bed. The overall pressure in the first stage of extractor 60 is maintained at slightly less the atmospheric pressure, so that solvent vapor is in intimate dentact with the rice bran for the maximum possible time.

The vapor contact step is preferably carried out at a relatively low temperature, ranging from about 100° F. to about 210° F., and most preferably from about 175° F. to about 200° F. for rice bran, under a partial vacuum which is determined by the mount of vacuum required to cause adequate flow and distribution of the vaporized solvent through the bed of vegetable matter. Lower temperatures may be used, if so required by varying the vacuum applied in the first stage. The temperature used in such applications will depend on the boiling point of the solvent at the pressure within the extractor and the upper limit required to avoid degradation of the oil. In some applications of the process, a substantially higher temperature may be used, as when the vapor is superheated to create a substantial pressure for extracting the oil from the vegetable matter. Alternatively, lower temperatures may be used, if so required, by varying the vacuum applied in the first stage. It will be understood that, in order for the vapor contact step to be effective, sufficient solvent vapor must condense to wet the vegetable matter. Thus, the vegetable matter entering the extractor 60 must be at a temperature that is at least somewhat lower than the dew point of the solvent vapor. The solvent superheat temperature will depend on the need to prevent oil and/or vegetable-matter degradation, and the temprature of the vegetable matter being fed. If the temperature of the vegetable matter is too close to the dew point of the solvent vapor, the vapor will condense too quickly, i.e., before it can fully penetrate the bed. Superheating the vapor avoids this problem.

With the extractor of this invention, working with rice bran, a vacuum above the bed of 10 to 40 inches of water, with the solvent vapor below the bed at substantially atmospheric pressure, has been found to be adequate to induce flow of the solvent vapor. The vacuum required will be established by the efficiency in contacting the vaporized solvent in the bed of vegetable matter with a fixed depth of vegetable matter on the belt. Too much differential pressure across the bed of vegetable matter will result in high vapor velocity which will carry vegetable matter, particularly light brans, upwardly into the flue. Suitable temperatures and vacuums can be readily determined by experimentation for each vegetable source.

Solvent vapors contact and penetrate the oil-beating particles in the bed, the solvent molecules condensing and forming a weak bond with the oil molecules so as to separate the oil from the solid material. Depending upon the heat balance desired, a portion of the solvent will pass through the bed of vegetable matter in vapor form; the remaining solvent and extracted oil will form a miscella that permeates the bed of vegetable matter. The solvent vapor which passes through the bed condenses on coils 76 and in condenser 74 and falls back onto the vegetable matter as a liquid, further contributing to the formation of miscella. In vapor contact section 100, the miscella will be substantially prevented from draining out through the perforations in belt 112 by the upwardly moving stream of vaporized solvent. Any liquid that seeps through belt 112 is collected in a collection drain 110.

Figure 2:
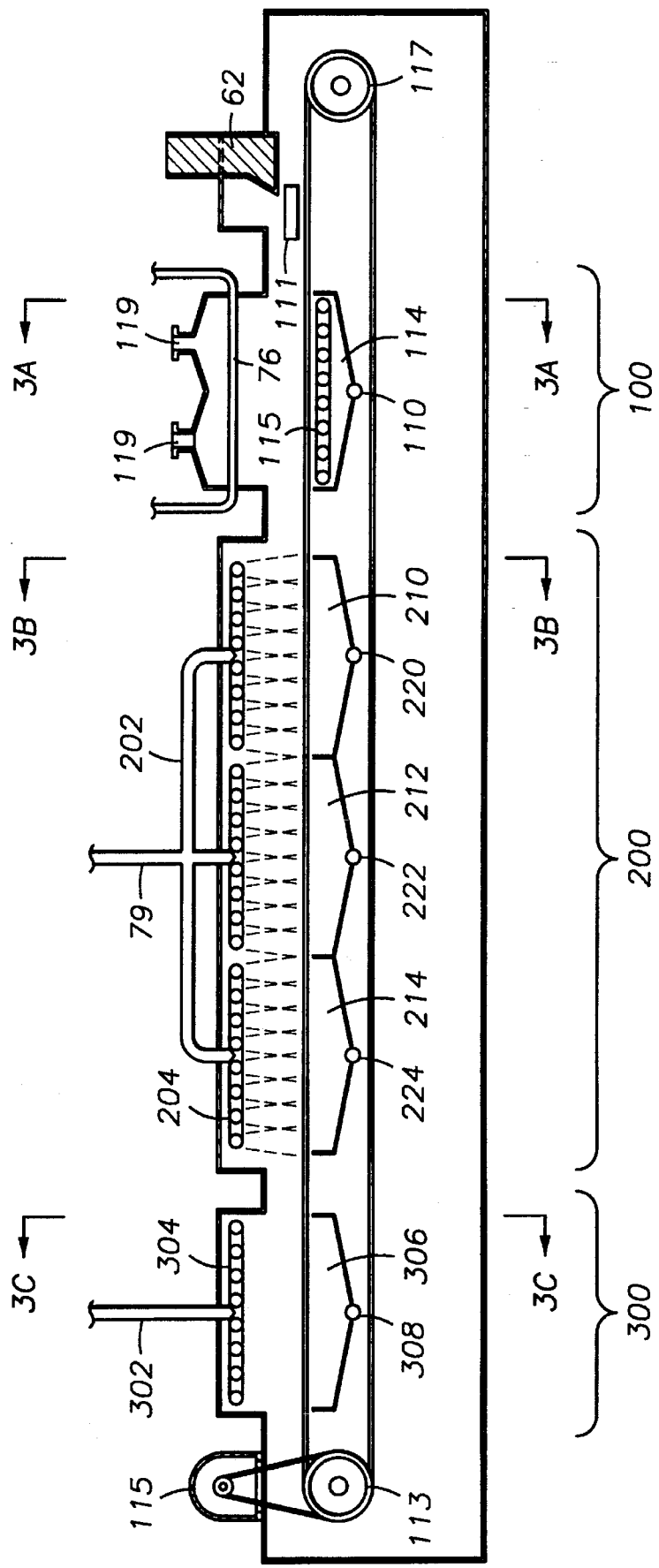
FIG. 2 is a simplified cut-away view of the extractor shown in FIG. 1.
Figure 3:
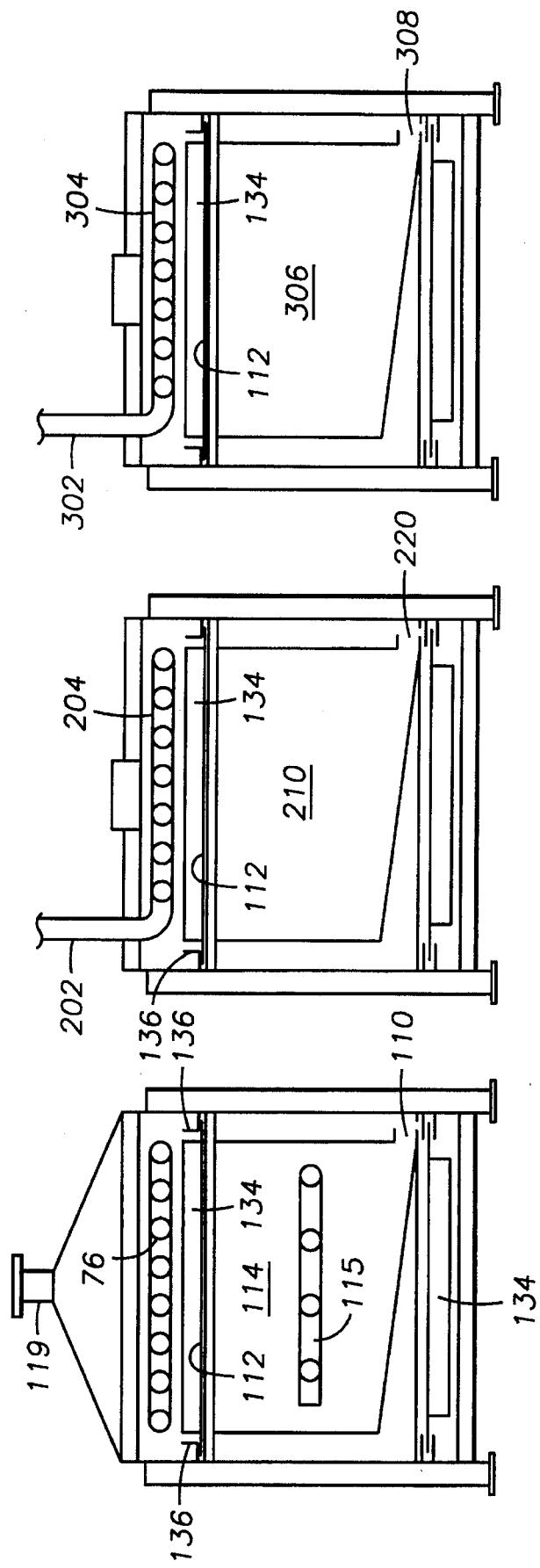
FIGS. 3A–C are cross-sectional views of the extractor shown in FIG. 2.

Still referring to FIGS. 1 and 2, in liquid contact section 200 (second stage), liquid solvent from stream 79 enters the top of the extractor and is placed in contact with the moving vegetable matter by a spray applicator 202. According to a preferred embodiment, the applicator 202 comprises a plurality of sprayer heads 204, however, other methods for applying the liquid solvent to the vegetable matter could be used, such as allowing the solvent to flow onto the bed in the form of a liquid curtain. The miscella that forms as the liquid solvent soaks into the bed of vegetable matter and extracts oil therefrom drains through belt 112 into chambers 210, 212, 214, where it is collected in liquid drains 220, 222, 224. In some applications of this invention, flow of miscella through the belt may be assisted by pressure differential, such as by the use of a vacuum below the belt.

The liquid solvent applied by sprayers 204 extracts oil from the vegetable matter as it flows through the belt. The added solvent, in combination with the liquid solvent produced by condensing the solvent vapor at coils 76 and condenser 74 provide an enhanced extraction efficiency not achievable by use of vapor or liquid solvent alone.

The present combination of vapor and liquid extraction results in greater extraction yields by the following distinct actions.
1. The vapor, in combination with the optionally reduced pressure, expands the bed, heats the grain and flees the oil for subsequent extraction;
2. The vapor penetrates the bed more uniformly and with a better degree of dispersement than if only liquid solvent were used. This allows more efficient contact between solvent and oil and results in the greater extraction of oil by the solvent;
3. The heat released by vapor condensation helps release the oil in the grain to further improve extraction of oil by subsequent contact with liquid solvent;
4. Any solvent vapor passing through the bed is condensed and falls back onto the bed, thereby contacting the grain in both vapor and liquid phases in the first stage. Effectively, this hybrid vapor/liquid extraction process results in a higher degree of solvent saturation in the bed and yields a higher oil extraction efficiency than using only liquid solvent.

The oil-depleted marc, along with some miscella, is carried on belt 112 into liquid removal section 300, where the miscella is separated from the marc by blowing an inert gas through the bed, using a partial vacuum supplied beneath the porous conveyor belt or pressure above the belt, or both. The gas from a feed stream 302 is preferably introduced to the upper portion of liquid removal apparatus 300 through a distributor 304. An inert gas is used when the presence of oxygen would alter the oil product obtained or create a risk of fire or explosion. The gas and miscella move downward through the bed into chamber 306 below the bed and are collected in drain 308. A partial vacuum may be induced by a vacuum pump 555, through vents in chamber 306, and this draws off the inert gas/solvent stream 678.

Because of the pressure differential across the bed, the gas expands as it passes through the bed, and some of the solvent evaporates. The expansion and the absorption, of the heat of vaporization cools the bed and the extracted liquid. If it is necessary to warm the bed, the inert gas may be preheated or heat exchanger tubes (not shown), carrying hot water, may be placed in the space above the belt to heat the incoming gas. If desired, heat exchanger return tubes may be placed in the lower part of chamber 306. As a result, the water in the return tubes may be chilled by the cooled gas for further use in heat exchangers elsewhere in the process.

The amount of pressure differential required to remove the liquid from the marc will vary depending upon the flow rate and the particular solvent and vegetable matter being processed. For rice bran, with the incoming gas at atmospheric pressure, a vacuum as low as about three inches of mercury gauge has been found sufficient to vaporize enough solvent to provide substantial cooling and to assist in forcing substantially all of the remaining miscella from the bed. It is more expensive to attain higher vacuums, but in some applications a vacuum as high as 27 inches of mercury gauge will be found to be desirable. Minimal experimentation will be required to determine the most effective pressure differential for particular materials.

The oil-depleted marc is carried by the belt into dryer 500. In dryer 500, the marc is passed over heating coils 510, which heat the marc to a temperature sufficient to evaporate any remaining solvent therefrom. Heating coils 510 comprise tubes through which stem is passed. A stream of preheated inert gas 512 from heat exchanger 610 enters dryer 500 and is used as the conveying medium to remove the vapor formed by evaporation. Heating the marc may also cause some water to evaporate from the marc. Evaporated solvent and water removed from the marc in dryer 500 are removed by the inert gas steam via line 520. As noted in more detail below, the inert gas system is a closed loop system. Other residual solvent removal procedures that may be used include such removal processes as are well known in the food processing industry.

According to a preferred embodiment, the dried marc is then conveyed by a conveyor 588 to a cooler surge bin 602, from where it is fed to a cooling chamber 600, where it is cooled to ambient temperature using air from a blower 502. The cooled marc is next conveyed by a conveyor 608 to a storage bin 680, where it is held as a finished product. Warm air exits the cooler via stream 660, passes through a cyclone 662, and is discharged to the atmosphere.

Oil-containing solvent, or miscella, is produced in each of the first three extraction stages 100, 200 and 300. This miscella leaves extractor 60 via drains 110, 220, 222 and 308 and is manifolded into a single miscella stream 135. According to a preferred embodiment, a vessel 137 provides the necessary holdup for a level controller 138 to regulate a pump 139, which pumps the miscella to a settling drum 140. In settling drum 140, any fine grains which were entrained in the miscella settle out and any water in the miscella separates. Both fine particles and water can be removed from settling drum 140 periodically.

A closed circuit inert gas nitrogen loop is associated with the present apparatus. Nitrogen is the preferred inert gas and is compressed in a compressor 690 and heated by passage through a heat exchanger 810. The flow of steam through heat exchanger 810 is controlled by a temperature control loop 812. From heat exchanger 810, the nitrogen flows to dryer 500. As discussed above, in dryer 500, the nitrogen passes through the marc, picking up solvent vapor and water that have been evaporated by the absorption of heat from steam in coils 510, and also by mass transfer mechanism. The flow rate of steam through coils 510 is controlled by controller 814.

As stated above, solvent laden saturated nitrogen passes out of dryer 500, via line 520. Line 520 is passed through a cyclone 530 and then is cooled by passage through a pair of chilled water heat exchangers 640 and 642 and enters the recovered solvent drum 644. In drum 644, the condensed solvent is separated from the nitrogen, which is returned to compressor 690. The recovered solvent is pumped back to solvent surge drum 72 by means of a pump 648. A level control loop 652 controls the solvent return stream, while a pressure control loop 654 controls the nitrogen recycle and makeup streams. Any nitrogen losses in the closed loop are made up in stream 520 by means of a nitrogen makeup stream 650, and any excess pressure is released by controller 654 via stream 677, to condenser 170 at the vacuum pump. The water that condenses out of the nitrogen as a result of processing the marc in dryer 500 is accumulated in drum 644 and is periodically withdrawn to the sewer via stream 656.

The marc leaving dryer 500 is fed into cooling chamber 600 via conveyor 588 and surge drum 602. In cooling chamber 600, air from a blower 502 is passed over the marc to achieve the desired cooling.

Figure 4:
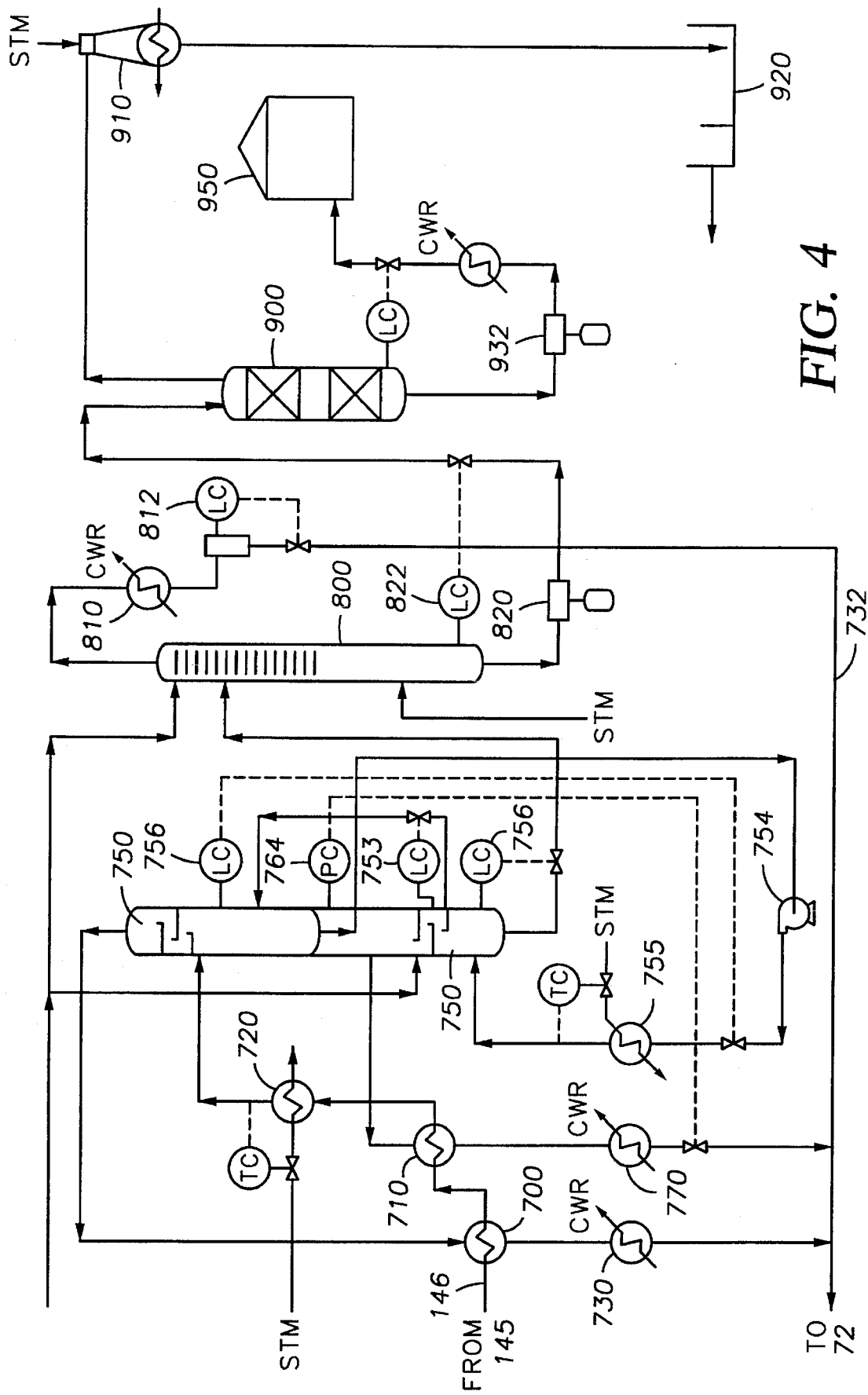
FIG. 4 is a flow diagram of a preferred embodiment of the recovery system and apparatus of the present invention.

Referring now to FIGS. 1 and 4, the miscella from drum 140 is fed to the recovery section by pump 145, under flow control 147. The purpose of the recovery section is to separate the miscella solution into its components, namely oil and solvent, plus a small quantity of water. The oil is the product of the plant, whereas the solvent is recycled to the extraction section for reuse. Any small amount of water that is recovered is discharged to the process sewer. An inline filter 144 is provided downstream of pump 145 to remove any fine grain solid from the miscella before it reaches the recovery section. The miscella is heated and a portion of the solvent is vaporized prior to the stream entering a low pressure (LP) flash tower 750. The heating and vaporization is accomplished in three heat exchangers in series: a miscella/LP vapor exchanger 700, a miscella/HP vapor exchanger 710, and a miscella vaporizer 720. In flash tower 700, the vaporized solvent passes overhead and transfers its heat. It is condensed in miscella/LP vapor exchanger 700 and is further cooled in a low pressure flash overhead cooler 730 prior to flowing to the solvent surge drum 72 via stream 732. Preferably at least two trays and a drawoff tray are provided in 750 for reflux contact, to insure that no oil is entrained overhead and to allow for good heat transfer.

The bottom stream 752 of flash tower 750, containing the oil plus remaining solvent and water, is pumped by pump 754, under level control 756, through the low pressure bottoms heater 755, and into a high pressure (HP) flash tower 760. The bulk of the remaining solvent and water is heated and vaporized by steam under temperature control and is flashed in flash tower 760. In the tower, the vapors contact reflux solvent on two trays (similar to tower 750) to effect separation. The vapors pass out overhead via stream 762, exchange heat and are condensed in miscella/HP vapor exchanger 710. The vapors are further cooled in a HP vapor overhead cooler 770. The solvent recovered from cooler 770, plus some water, then flows to solvent surge drum 72 by pressure control 764. Level control of 750 is maintained by a level control on the trap out tray of 760, wherein a high level of liquid on this tray is reduced by the level controller 753 passing the liquid back to the 750 tower for additional processing through the circuit. This insures that if there is insufficient flashing and recovery of solvent in flash tower 750, resulting in excess solvent liquid in flash tower 760, the liquid solvent will be recycled back through the vaporizer 755 for subsequent recovery. The bottom liquid level of 760 is controlled by a level controller 756 which feeds the accumulated oil, plus a residual amount of residual solvent and water to the oil stripper 800.

In oil stripper 800, the oil is subjected to steam contacting and solvent refluxing on eighteen trays, to achieve final removal of residual solvent and water. Any possible color bodies present in the oil are also removed by the stripping action to produce a product oil which is then pumped by pump 820, under level control 822 to a dehydrator tower 900, for final processing. The overhead vapors from the oil stripper are condensed in an oil stripper condenser 810, and the condensed liquid flows to the solvent surge drum 72, under level control 812.

The final processing of the oil product consists of passing it down dehydrator tower 900. Dehydrator 900 is a packed column operating at a slight vacuum produced by a single stage steam jet 910. The processing operation will remove last traces of water from the oil, passing it through the jet nozzle. The steam and water vapor removed are condensed in the jet condenser unit of the steam jet and a barometric leg to a hot well 920 is provided to permit the condensate to flow to the process sewer. The product oil is withdrawn from dehydrator 900 under level control 930 and is pumped by 932, through an oil product cooler 940, to an oil storage tank 950. There it is retained for subsequent sale as a product of the plant.

The preferred solvent for this process is an acetate such as, for example, methyl acetate or ethyl acetate, although other solvents such as alcohols or other organic solvents capable of forming weak chemical bonds can be used. The most preferred solvents are food grade solvents, such as ethyl acetate, methanol, ethanol, isopropyl alcohol, hexyl alcohol, heptyl alcohol, or dectyl alcohol, either alone or in various combinations. Solvents having 6 or fewer carbon atoms are preferred, particularly when the extracted marc is to be used as a food product, since higher carbon solvents tend to leave an unpleasant taste in the marc. One skilled in the art can, with minimum experimentation, determine which solvent is optimum for use in combination with a particular vegetable material. Applicants have determined that ethyl acetate works particularly well with rice bran, for example.

The contacting of prepared vegetable matter with a volatilized extraction solvent is carried out at a volumetric ratio of solvent to vegetable matter that depends on the solubility of the particular oil to the solvent used, and the percentage of oil in the vegetable matter. In extraction of rice bran, the amount of solvent utilized to extract the oil from the vegetable matter ranges from about 0.7:1 to about 5:1 on a weight of solvent to weight of vegetable matter basis. With rice bran, a solvent/oil ratio of 1.5 to 2:1 by weight has been found to give, good results.

In the processing of vegetable matter according to this invention, in many cases it will be desirable to extract substantially all of the oil. However, the mount of oil to be extracted from particular vegetable matter depends on the products to be produced. In the extraction of oil from cooked potato chips, it has been found that about 40% of the oil can be extracted by the process and apparatus of this invention. If the extracted vegetable matter, marc, is subsequently processed into food and feed products, in some cases it may be desirable to leave a particular minimum oil content in the marc. Applicants have easily reduced the oil content of rice bran from about 20 percent by weight to less than 1 percent by weight in a laboratory apparatus. The amount of oil extracted depends on the contact time between the vegetable matter and the solvent, the concentration of oil in the vegetable matter, the temperature, and the pressure during the solvent extraction operation. Minimal experimentation will establish the most efficient conditions of operation.

Conventional temperature, pressure and flow controls may be used to insure that optimum temperatures, pressures and flow rates are maintained at all stages of the process.

The critical features of the extraction process of this invention are: 1) that the vegetable matter provide sufficient extraction surface from which the oil can be remove; 2) that the proper solvent be used and that at least the initial contact between vegetable matter and solvent be made with the solvent in vapor form; 3) that an additional amount of liquid solvent be applied to the vegetable matter along with the condensed solvent vapor that drops from the vapor condenser; 4) that the temperature during the solvent extraction be maintained as low as possible (typically less than 210° F.) to avoid degradation of the oils and proteins within the vegetable matter; and 5) that in view of these factors, the contact time between the solvent vapors and the vegetable matter be sufficient to permit the desired amount of extraction of oil from the vegetable matter.

Temperatures and pressures discussed in the foregoing description are by way of example only, and are not intended to be limiting. Various temperatures and pressures may be found to be desirable, depending upon the particular vegetable matter being processed, and other conditions of operation. For example, in the processing of chips and other cooked foods to reduce the content of oil absorbed during cooking, higher temperatures and/or greater pressure differential may be used to carry the oil out of the extraction bed with the vaporized solvent, so that no liquid miscella remains in the bed. Such higher temperatures and/or greater pressure differentials are also useful for oil extraction from other vegetable matter. For other materials and solvents, higher or lower vacuums may be desirable, or it may be desirable to operate with a pressurized system rather than with a vacuum. Higher pressure differentials, and higher pressures or greater vacuums, are achieved, however, only at a greater cost for equipment and operating expense, and this cost must be balanced against the cost of separating the liquid miscella from the marc as described herein.

Example 1 below provides a detailed description of the extraction of an oil from rice bran.

EXAMPLE 1

This example discloses the results of using a preferred embodiment of the method of extracting the oil contained in rice bran, using an ethyl acetate solvent. 3019 g of bran comprising 18.30 percent fat were changed to a bench scale extractor. According to the present invention, solvent contacted the bran in both vapor, and liquid phases. Approximately 4800 g of solvent vapor and 1334 g of liquid solvent were supplied. After removing the liquid from the marc as disclosed above, the products of the extractor were as follows: 2375 g miscella, 3964 g marc (containing some residual solvent and water), and 2814 g free solvent. The miscella was analyzed and found to contain 453 g oil, or just over 80% of the oil contained in the original bran feed. Analysis of the marc indicated that it contained 2.7% oil, 35.8% solvent, and 61.5% other (carbohydrates, fiber, ash, minerals, vitamins, amino acids and water). After the marc was dried to remove residual solvent and water, the marc contained 4.1% oil and 95.9% other. Thus, the percent oil in the bran feed was reduced from 18.3 to 4.1 through the combined application of solvent vapor and liquid solvent according to the present invention.

Although preferred embodiments of the invention have been shown and described herein, many variations thereof will be suggested by this description to those skilled in the art. Accordingly, the invention is not limited to these specific embodiments, but extends to all variations which may be included within the scope of the appended claims, and equivalents thereof.

I/We claim:

1. A method for extracting at least a portion of oil from an oil-containing vegetable material comprising the steps of:

establishing a continuously moving horizontal bed of the vegetable material, and passing a solvent vapor through the bed;

condensing a portion of said solvent vapor above said bed and allowing it to fall back onto said bed;

spraying additional liquid solvent onto said bed;

allowing liquid to drain from said vegetable material; and removing substantially all liquid from said vegetable material.

2. A method as defined by claim 1 wherein a portion of said solvent vapor condenses in the bed of vegetable material and forms a miscella of oil and solvent, and a portion of the solvent vapor passes through the bed.

3. A method as defined by claim 2 wherein the solvent is methyl acetate, ethyl acetate or an alcohol having less than 7 carbon atoms.

4. A method as defined by claim 2 wherein a gas is then passed through the vegetable material and at least some of the miscella to drive miscella from the vegetable material.

5. A method as defined by claim 2 wherein the vegetable material and the miscella are on a continuously moving horizontal belt during the contacting by the gas.

6. A method as defined by claim 5, further including a low pressure region for drawing solvent vapor through said bed and said belt.

7. A method as defined by claim 5 in which the low pressure region is caused by a low pressure flue and a condenser and/or a vacuum pump or steam jet.

8. A method as defined by claim 6 in which the low pressure region is caused by a low pressure flue and a condenser.

9. A method as defined by claim 6 in which the low pressure region is caused by a vacuum pump.

10. A method as defined by claim 6 in which the low pressure region is caused by a steam jet.

* * * * *